United States Patent
Banerjee et al.

(10) Patent No.: US 12,302,127 B2
(45) Date of Patent: May 13, 2025

(54) MANAGEMENT SERVICE DEVICE PLATFORM CREATION AND DEVICE CONFIGURATION

(71) Applicant: Omnissa, LLC, Mountain View, CA (US)

(72) Inventors: Swarnadeep Banerjee, Bangalore (IN); Dylan Thomas, Palo Alto, CA (US); Keerthana Parthasarathy, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 643 days.

(21) Appl. No.: 17/485,664

(22) Filed: Sep. 27, 2021

(65) Prior Publication Data

US 2023/0101738 A1  Mar. 30, 2023

(51) Int. Cl.
| | | |
|---|---|---|
| *H04W 24/02* | (2009.01) | |
| *H04W 8/18* | (2009.01) | |
| *H04W 24/10* | (2009.01) | |
| *H04W 48/16* | (2009.01) | |
| *H04W 48/18* | (2009.01) | |

(52) U.S. Cl.
CPC ............. *H04W 24/02* (2013.01); *H04W 8/18* (2013.01); *H04W 24/10* (2013.01); *H04W 48/16* (2013.01); *H04W 48/18* (2013.01)

(58) Field of Classification Search
CPC ....................................................... H04W 24/02
See application file for complete search history.

(56) References Cited

U.S. PATENT DOCUMENTS

| | | | | |
|---|---|---|---|---|
| 9,998,323 | B2* | 6/2018 | Chhatwal | H04L 41/0803 |
| 2014/0280913 | A1* | 9/2014 | Karren | H04W 4/60 |
| | | | | 709/224 |
| 2016/0328216 | A1* | 11/2016 | Leonelli | G06F 9/547 |
| 2018/0367526 | A1* | 12/2018 | Huang | H04L 63/0807 |
| 2021/0037456 | A1* | 2/2021 | Wang | H04W 48/18 |
| 2021/0344718 | A1* | 11/2021 | Raleigh | H04W 88/08 |

* cited by examiner

*Primary Examiner* — Guang W Li
(74) *Attorney, Agent, or Firm* — Kim & Stewart LLP

(57) ABSTRACT

Disclosed are various examples of management service based device platform creation and device configuration. In some examples, user interactions with a platform creation portal user interface define a device platform that includes a platform ability, and an ability parameter that adjusts the platform ability. A device platform registry is updated to include the platform ability and the ability parameter. A device configuration request associated with the device platform is received. The device platform is transformed to generate a device management console with user interface elements that identify at least one user-defined argument for the at least one ability parameter.

20 Claims, 5 Drawing Sheets

MANAGEMENT SERVICE DEVICE PLATFORM CREATION AND DEVICE CONFIGURATION

BACKGROUND

An endpoint management service can manage a variety of types of devices and endpoints, including devices, Internet-of-Things (IoT) devices, and other types of devices. However, as endpoint management expands to include more types of devices, the process of connecting devices to the management service can be difficult and time consuming. Some devices are associated with a particular user who can install management software to the device or otherwise assist administrators in initiating management integration. However, other devices can be headless, such as IoT sensor devices. Further devices can be user agnostic such as devices that are utilized on premises to connect to network services or virtualized devices.

Adding or updating an additional device platform or type of device can also be time consuming for enterprise users and management service administrators. The management service can lack a management tool or interface to configure a particular type of device, and adding such an interface can require a custom-built device-specific interface. Each time a new feature is rolled out for existing products, the feature may still be unavailable until the management service updates the management interface to support the new feature. Integrating existing and newly deployed devices and device features can be a difficult and inefficient task. As a result, there is an increasing need for a more efficient and extensible solution for device platform creation and device configuration using a management service.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to device platform creation and device configuration using management service integrations. An endpoint management service can manage a variety of types of devices and endpoints, Internet-of-Things (IoT) devices, and other types of devices. However, as endpoint management expands to include more types of devices and endpoints, the process of connecting devices to the management service can be difficult and time consuming.

Adding or updating an additional device platform or type of device can be time consuming. The management service can lack a management tool or interface to configure a particular type of device, or a particular ability of the device. Traditionally updating the management service to include these features can require customized programming and development of a new user interface or set of user interface elements. Each time a new device or a new feature is rolled out, they can remain unavailable in existing paradigms until the management service adds specific support. Integrating existing and newly deployed devices and device features can be a difficult and inefficient task. As a result, there is an increasing need for a more efficient and extensible solution for device platform creation and device configuration using a management service.

The present disclosure provides mechanisms that enable manufacturer or other provider integrations including a platform creation portal user interface for device platform creation and translation of the new device platform into a device management console for device configuration. Device configurations can be applied to management agentless devices using a headless device connector service. That is, the device connector service can be headless by inclusion of a service that operates without a direct user interface. Management agentless devices can include devices that lack a management agent of an endpoint management service that an enterprise can use for management. Management can be performed by enterprise users and administrators that employ an endpoint management service. The management service can be automatically updated by translating new device platforms and new platform abilities into a device management console user interface that includes user interface elements to define arguments for manufacturer-specified parameters of platform abilities. Management agentless devices can include IoT devices, thin client devices, headless or automated devices, and other types of devices that lack a management agent of the endpoint management service.

Figure 1:
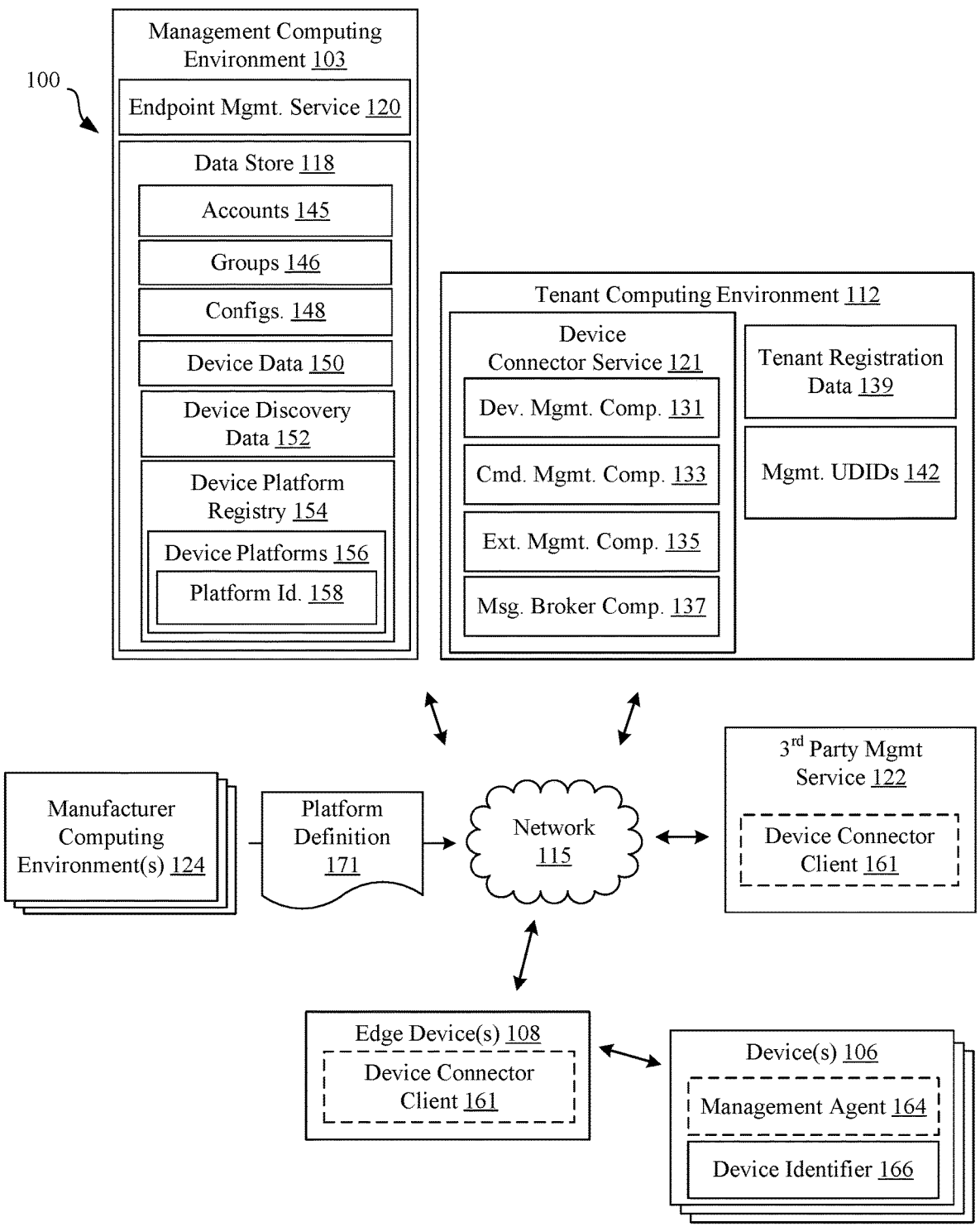
FIG. 1 is a drawing of a networked environment including components that enable device platform creation and device configuration, according to the present disclosure.

With reference to FIG. 1, shown is an example of a networked environment 100. The networked environment 100 can include one or more management computing environments 103, one or more devices 106, one or more edge devices 108, a tenant computing environment 112, a third-party management service 122, and a manufacturer computing environment 124 in communication with one another over a network 115.

The network 115 can include wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 115 can also include a combination of two or more networks 115. Examples of networks 115 can include the Internet, intranets, extranets, virtual private networks (VPNs), and similar networks.

The management computing environment 103 can include, for example, a server computer, or any other system providing computing capability. Alternatively, the management computing environment 103 can include a plurality of computing devices that are arranged, for example, in one or more server banks, computer banks, or other arrangements. The management computing environments 103 can include a grid computing resource or any other distributed computing arrangement. The computing devices can be located in a single installation or can be distributed among many different geographical locations.

The management computing environments 103 can also include or be operated as one or more virtualized computer instances. For purposes of convenience, the management computing environment 103 is referred to herein in the singular. Even though the management computing environment 103 is referred to in the singular, it is understood that a plurality of management computing environments 103 can be employed in the various arrangements as described above. As the management computing environment 103 communicates with the device 106 remotely over the network 115, the management computing environment 103 can be described as a remote management computing environment 103.

Various applications can be executed in the management computing environment 103. For example, each management computing environment 103 can include an endpoint management service 120 that includes a device management console, as well as other applications that may be executed in the management computing environment 103. Various data is stored in one or more data stores 118 that are accessible to the management computing environment 103. The data store 118 may be representative of a plurality of data stores 118, which can include relational databases, object-oriented databases, hierarchical databases, hash tables or similar key-value data stores, as well as other data storage applications or data structures. The data stored in the data store 118 is associated with the operation of the various applications or functional entities described below. This data can include one or more device records, compliance rules for devices, accounts 145, groups 146, configurations 148, device data 150, device discovery data 152, as well as potentially other data.

The accounts 145 can include user accounts, device accounts, virtual device accounts, and other accounts with the endpoint management service 120. The groups 146 can include user groups, device groups, and other groups of accounts 145. The configurations 148 can include settings, commands, actions, and other device-specific configurations for devices 106. For example, if a device 106 is an Internet-of-Things device 106 such as a sensor device 106, a configuration 148 can include a command or configuration to provide a particular detected parameter or state of the device 106 periodically, on demand, and on a schedule. The device data 150 can include parameters and other states collected from the device 106.

The groups 146 can refer to a group of accounts 145 with the endpoint management service 120. User and device groups can be created by an administrator of the management service such that a batch of devices 106, or a set of users logging in to use a device 106 for enterprise purposes, can be configured according to common settings. For instance, an enterprise can create a group 146 for the marketing department and the sales department, where devices 106 in the marketing department are configured differently from the devices 106 in the sales department.

The device 106 can be representative of one or more devices that may be connected to the network 115. Examples of devices 106 include processor-based systems, such as desktop computers, laptop computers, a personal digital assistant, a cellular telephone, a smartphone, a tablet computer system, smart speakers or similar headless devices, or any other device with like capability. Examples of devices 106 can also include IoT devices and sensors that collect and report sensor samples. Devices 106 can collect and report samples that include device internal and device external sensor values, internal hardware usage data, and other information. The device 106 can also be equipped with networking capability or networking interfaces, including a localized networking or communication capability, such as a near-field communication (NFC) capability, radio-frequency identification (RFID), Bluetooth, Wired Bacnet, Thread, Zigbee, read write capability, and other localized networking and communication capability.

The device 106 can include an operating system. The operating system can be configured to execute various client applications. Examples of operating systems include MICROSOFT WINDOWS®, APPLE macOS®, APPLE iOS GOOGLE ANDROID®, and various distributions of Linux. The client applications can include web browsers, enterprise applications, social networking applications, word processors, spreadsheet applications, and media viewing applications.

The edge device 108 can include a gateway device or other devices capable of receiving and responding to communications from the device 106, as well as providing instructions to the device 106. The edge device 108 can be a third-party device with respect to the endpoint management service 120 and the device connector service 121, such as a device operated by the third-party management service 122. Alternatively, the edge device 108 can include devices operated by an enterprise corresponding to a tenant of the endpoint management service 120, or devices operated by the endpoint management service 120 itself. In some examples, the third-party management service 122 can route communications with a device 106 through an edge device 108. The edge device 108 can also execute a device connector client 161 that operates as a client of the device connector service 121.

The tenant computing environment 112 can include, for example, a server computer, or any other system providing computing capability that is operated by a tenant or enterprise that employs the endpoint management service 120. The tenant computing environment 112 can include a plurality of computing devices that are arranged, for example, in one or more server banks, computer banks, or other arrangements. The tenant computing environment 112 can include a grid computing resource or any other distributed computing arrangement. The computing devices can be located in a single installation or can be distributed among many different geographical locations. The tenant computing environment 112 can be operated by a third-party service with respect to the management computing environments 103; alternatively, the tenant computing environment 112 can be affiliated with and part of one or more management computing environments 103.

The tenant computing environment 112 can execute one or more applications including a device connector service 121. The tenant computing environment 112 can also include one or more data stores storing data that includes a device connector service 121, tenant registration data 139, management Unique Device Identifiers (UDIDs) 142. The tenant computing environment 112 can also store tokens, certificates, credentials, and other authentication data for authentication with the edge devices 108, third-party management services 122, and the endpoint management service 120.

The manufacturer computing environment 124 can include, for example, a server computer, personal computer, personal device, or any other system providing computing capability that is operated by a manufacturer of devices 106. The manufacturer computing environment 124 can include a plurality of computing devices that are arranged, for example, in one or more server banks, computer banks, or other arrangements. The manufacturer computing environment 124 can include a grid computing resource or any other distributed computing arrangement. The computing devices can be located in a single installation or can be distributed among many different geographical locations. The manufacturer computing environment 124 can be operated by a third-party service with respect to the management computing environments 103. Multiple manufacturers and manufacturer computing environments 124 can integrate with the endpoint management service 120. The manufacturers can partner with the endpoint management service 120 to enable enterprise users of the endpoint management service 120 to more quickly and efficiently adopt new devices and abilities.

The endpoint management service 120 can provide endpoint management for multiple tenants, which can refer to enterprises or enterprises that employ the endpoint management service 120. The endpoint management service 120 can authenticate various tenants using tenant authentication credentials such as a tenant-specific certificate, tenant-specific usernames and passwords, and others. Once authenticated, the endpoint management service 120 can provide a device management console user interface that enables a specific enterprise or tenant to manage a set of devices 106 that are registered in association with the enterprise.

The endpoint management service 120 can provide a manufacturer or device provider portal user interface. The endpoint management service 120 can authenticate various manufacturers using manufacturer authentication credentials such as a manufacturer-specific and manufacturer-provided certificates, manufacturer-specific usernames and passwords, and the like. Once authenticated, the endpoint management service 120 can provide a platform creation portal user interface that enables a specific manufacturer to create and update device platforms 156 within the device platform registry 154.

The platform creation portal user interface can generally enable a manufacture to provide a platform definition 171 by interacting with user interface elements to define a device platform 156. For example, the manufacturer computing environment 124 can access a website or web page to provide the platform definition 171. Alternatively, the endpoint management service 120 can provide a platform upload application programming interface (API) or another platform upload functionality. A manufacturer computing environment 124 can invoke or otherwise utilize the platform upload functionality to upload a platform definition 171 or a device platform 156 in a predetermined format.

The device platform 156 can refer to the data structure or structures that define a new device or set of devices within the device platform registry 154. Each device platform 156 can be identified by a globally unique platform identifier 158 among all device platforms 156 from all manufacturers. The device platform 156 can include a set of abilities, with each ability having one or more parameters that affect or adjust the operation of the ability when performed by a device 106. The device platform 156 can also include code, commands, and other instructions that can invoke the ability to be performed by a corresponding device 106 according to tenant-defined arguments provided for the manufacturer-defined parameters. The endpoint management service 120 can utilize the device platform 156 to automatically generate and update a device management console user interface for management of devices 106 corresponding to the device platform 156. This is discussed in greater detail with respect to FIG. 2.

The endpoint management service 120 can be executed to oversee the operation of devices 106, virtual devices, and other endpoints. The endpoint management service 120 can be referred to as a unified endpoint management (UEM) service. Managed devices 106 can be enrolled with the endpoint management service 120. Virtual devices can include virtual machines and other virtual components that provide desktop, application, or desktop and application services that are accessed by the devices 106. In some examples, an enterprise, such as a company, enterprise, or other entity, can operate the endpoint management service 120 to oversee or manage the operation of the devices 106 of its employees, contractors, customers, or other users having accounts 145 with the enterprise. The endpoint management service 120 can further cause device records, groups 146, and accounts 145 to be created, modified, or removed from the data store 118. Each tenant can include a logically separate group of accounts 145, groups 146, configurations 148, device data 150, device discovery data 152, and compliance rules. As a result, this information can be tenant-specific with respect to a tenant and an identifier of the tenant such as a tenant account, a tenant email domain or address, and other information.

The device discovery data 152 can include information to provide to a device 106 that is in a discovery process, such as an auto-discovery process or otherwise initially connecting to a particular network 115. The device discovery data 152 can include a tenant email domain, an enterprise or tenant identifier, and a Uniform Resource Locator (URL) or another endpoint identifier for a device connector client 161, or a device 106 executing the device connector client 161. The enterprise or tenant identifier can include a subtenant or sub-group 146 of the enterprise tenant as a whole. The tenant identifier can be utilized for devices 106 to be integrated with the endpoint management service 120, using the device connector service 121. For example, the subtenant group 146 can include a headless-device-specific group 146 that includes only headless devices and devices operating in a headless mode, a thin client device group, a user agnostic device group, an IoT device group, a UEM agentless device group, or another device-category-specific group 146. An identifier for a group 146 can be considered an enterprise or enterprise identifier corresponding to a subgroup of a root enterprise identifier that identifies the enterprise or tenant as a whole.

The device connector service 121 can include a cloud- or regionally-hosted service that operates in conjunction with a device connector client 161 that can be executed using a gateway, another edge device 108, or a third-party management service 122. The device connector service 121 can include a headless service that exposes application programming interfaces (APIs) for communications with the endpoint management service 120, and also for communications with one or more device connector client 161 that in turn maintains communications with one or more devices 106. The device connector service 121 can enable enrollment and subsequent commands and management of the devices 106. While any device 106 can be managed in this architecture, this is particularly useful for agentless devices 106 that do not include a management agent 164 associated with the endpoint management service 120. A management agent 164 can in some cases enable direct communications, such as device 106 check-ins directly with the endpoint management service 120.

The device connector service 121 can include a device management component 131, a command management component 133, an extension management component 135, and a message broker component 137, among other instructions and executable components. The device connector service 121 can access tenant registration data 139 and can generate and store management Unique Device Identifiers (UDIDs) 142.

The message broker component 137 can include a Message Queuing Telemetry Transport (MQTT) broker, Rabbit Message Queuing (RabbitMQ) broker, Extensible Messaging and Presence Protocol (XMPP) component, Google Cloud Messaging component, Kafka component, or another message queuing component that can provide and enable a publish-subscribe mechanism.

A management UDID 142 can be a globally unique device identifier for a device 106 for management by the endpoint management service 120. The management UDID 142 can be different from the device identifier 166. For example, the device identifier 166 can be a manufacturer-assigned or enterprise-assigned device identifier 166, such as a serial number for the device 106. By contrast, the management UDID 142 can be generated by the device connector service 121 or a component of the device connector service 121.

The device connector service 121 can include a UDID generation algorithm that generates the management UDID 142 for a device 106. The UDID generation algorithm can include a hash function or another type of algorithm. The UDID generation algorithm can take the device identifier 166, and one or more additional values as inputs, such as a tenant identifier and a client identifier. The tenant identifier can include a tenant email domain or another identifier of the tenant or enterprise. The client identifier can include an identifier of a third-party management service 122, an identifier of an edge device 108, or an identifier of the instance of the device connector client 161 service that is communicating with the device 106. The third-party management service 122 can include a legacy or additional management service operated separately from the endpoint management service 120, each of which can be employed by the tenant to manage the device 106. The third-party management service 122 can have managed devices 106 for multiple tenants.

The device management component 131 can include a number of APIs, for example: a connector enroll API, a connector sample API, and a connector beacon or connector check-in API. In some examples, each of these APIs can operate for a single device 106 and in other cases, each of these APIs can support bulk or multi-device operations. In general, these APIs can abstract out the complexity of comparable UEM or endpoint management service APIs. For example, the connector enroll API can operate in place of four different endpoint management service APIs.

The connector enroll API can take the following parameters: tenant email domain, enterprise group identifier, client identifier, and device identifier 166. The tenant email domain can be used to identify the tenant-specific UEM service instance of the endpoint management service 120 that the device 106 should be enrolled into and identifies the tenant or enterprise to which the device 106 belongs. The enterprise group identifier can identify the enterprise group 146 or subgroup that the device 106 gets enrolled into. The client identifier can include a tenant identifier of the tenant, an identifier of a third-party management service 122, or an identifier of the instance of the device connector client 161 service that is communicating with the device 106.

The device identifier 166 can be a manufacturer-assigned or enterprise-assigned device identifier, such as a serial number for the device 106. In order to guarantee uniqueness across all tenants and all device connector clients 161 (and/or third-party management services 122), the device connector service 121 can hash the device identifier 166 with the tenant email domain and the client identifier when the connector enroll API is called.

This management UDID 142 can then be associated with the device 106 and its device identifier 166 and can be provided back to the device connector client 161 that invoked the connector enroll API. The device connector client 161 can then use the management UDID 142 in subsequent connector service API calls to the device connector service 121 for the device 106, such as providing samples or device data 150 using the connector sample API, or relaying a device check-in beacon using the connector beacon API.

As part of the connector enroll API functionality, the device connector service 121 can query the endpoint management service 120 for an enrollment user associated with the enterprise group identifier provided through the connector enroll API. If there is more than one, the device connector service 121 can pick the first one identified. Using a user identifier for the enrollment user, the device connector service 121 can register the device 106 or request enrollment data from the endpoint management service 120, providing the management UDID 142.

The endpoint management service 120 can return an enrollment token and other enrollment data. The device connector service 121 can enroll the device 106 with the endpoint management service 120 and receive a token such as an HMAC token for that device 106, which can be stored and used to authenticate subsequent endpoint management service API calls for that device 106. The endpoint management service 120 can create an account 145 for the device 106 based on the management UDID 142. The management UDID 142 is then returned to the device connector client 161. The edge device 108 or third-party management service 122 that executes the device connector client 161 can store this value for subsequent device connector service API calls.

The device connector service 121 can maintain a database or data structure within a data store that contains all of the management UDIDs 142 that it integrates or manages, along with their HMAC token, tenant email domain (used as an enterprise tenant identifier), and the client identifier of the device connector client 161 service or third-party management service 122 that is managing that device 106. This maintains the relationship of devices 106 that are managed or integrated "by proxy" using the device connector service 121.

From the perspective of the endpoint management service 120, management of an agentless device 106 that is integrated using the device connector service 121 can be similar to other managed devices 106 that include a management agent 164. This means operations like adding a device command to a command queue can be performed without modification. The device connector service 121 can act as a proxy that enables agentless devices 106 to implement commands from a command queue that is typically accessed and implemented using a management agent 164.

The command management component 133 can poll a component of the endpoint management service 120 to be notified of any pending commands for any devices 106 it manages. The command management component 133 can notify the device connector client 161 that is associated with that device 106 and its management UDID 142. The command management component 133 can include the management UDID 142 in the notification to the device connector client 161. This notification process can include publishing to the message broker component 137 such as an MQTT broker.

The device connector client 161 can have a messaging subscription with the message broker component 137 to pick up the notifications. The notification can function as a "shoulder tap" or "dinner bell" of pending work, which contains only the management UDID 142 in the message. The device connector client 161 can query the device connector service 121 for the actual command payload. For example, the device connector client 161 can invoke the connector beacon or connector check-in API of the device connector service 121.

The device connector service 121 does not store or buffer the commands or maintain the device command queue itself. Rather, the device connector service 121 relays the command retrieval request to the endpoint management service 120 at that time or on demand. The command queue is maintained by the endpoint management service 120, as for other devices 106 such as those that include a management agent 164. The endpoint management service 120 can provide the commands in the device 106 command queue to the device connector client 161, which relays the commands back to the device 106. In other examples, the endpoint management service 120 can return the commands to the device connector service 121, which can transmit the commands to the device connector client 161, which provides the commands to the device 106.

In some implementations, the device connector service 121 can sequentially poll the endpoint management service 120 for each device 106 in its list of integrated devices 106. The device list can be divided according to a group 146 and a polling thread can be spawned for each group 146. However, in other cases the device connector service 121 and the endpoint management service 120 can include a pub/sub mechanism or a batch request mechanism to provide indications of pending commands.

The extension management component 135 can register and manage the third-party management services 122, edge devices 108, and other partner or third-party extensions that can execute or operate as a device connector client 161. In other words, each device connector client 161 can be registered along with a client identifier as discussed.

In order to use endpoint management APIs, the extension management component 135 of the device connector service 121 can be configured to authenticate each tenant that is associated with a device 106 that it integrates. The extension management component 135 can accomplish this using a token service. The device connector service 121 can receive or otherwise be provisioned with a tenant identifier and tenant secret for each endpoint management service 120 tenant. The extension management component 135 can provide a connector tenant registration API.

A device management console user interface of the endpoint management service 120 can include an 'enable device connector service' user interface element that invokes the connector tenant registration API and provides tenant registration data 139 as parameters for the logged-in tenant. The tenant registration data 139 can include a tenant identifier or root enterprise identifier of the tenant with the endpoint management service 120. The tenant registration data 139 can include a tenant identifier, a tenant secret, administrator credentials or API credentials, an API token for API communications, and a URL of the endpoint management service 120 for API and other communications. Once the device connector service 121 has the tenant identifier and tenant secret, tokens can be generated by a token service of the endpoint management service 120 or a third-party token service. The token can be refreshed for tenant authentication.

There can be multiple layers of authentication for device and management service integration using a device connector service 121. One layer can include service to service authentication between the services, including the endpoint management service 120, the device connector service 121, and the device connector client 161 services on third-party devices or cloud services. Service to service authentication can be accomplished using certificate mutual authentication where the services exchange signed certificates to authenticate each other. Tenant authentication can be accomplished using token service tokens. Device 106 to endpoint management service 120 authentication can use hash-function-based message authentication code (HMAC) tokens. In some cases, the manufacturer computing environment 124 can authenticate with the endpoint management service 120 using the service to service paradigm. However, in other cases, the manufacturer computing environment 124 can authenticate using token service tokens or HMAC tokens.

Since a management-agentless device 106 does not communicate directly with the endpoint management service 120, the device connector service 121 can include a mechanism that receives a management HMAC token from the endpoint management service 120 when it enrolls the device 106. The device connector service 121 can also retrieve the HMAC token based on management UDID 142 to authenticate with the endpoint management service 120 for relayed check-ins, relayed device data 150, and other device-specific communications. Generally, a management-agentless device 106 can initially communicate with the device connector client 161, which forwards communications to the device connector service 121, which in turn communicates with the endpoint management service 120.

Data flow for management agentless devices 106 can be performed from the device 106 to the edge device 108, to the tenant computing environment 112, and to the endpoint management service 120. However, the reverse flow can be achieved using a push notification for pending commands. For example, using a push notification from the endpoint management service 120 to the device connector service 121; and then using a push notification from the device connector service 121 to the device connector client 161, which can relay data to the device 106.

The third-party management services 122 can be services developed and deployed by third parties such as hardware vendors. The third-party management services 122 can provide multi-tenant SaaS services that manage fleets of individual devices 106. Third-party management services 122 can include or integrate with a device connector client 161 that enables communication and integration with the device connector service 121. The device connector client 161 or another version of the device connector client 161 can be installed on gateways and other edge devices 108. The device connector client 161 can communicate with connected devices 106 using an appropriate protocol such as REST APIs and others. In further cases, the device connector client 161 can be installed on a device 106 directly, even if the device 106 does not or cannot execute a management agent 164 of the endpoint management service 120. The device connector client 161 can also include an implementation of an API specification utilized by or published by the device connector service 121 or the endpoint management service 120 for communications with the devices 106.

The endpoint management service 120 can generate a user interface through which an administrator can create device-platform-specific and device-specific configurations 148 for an enterprise tenant of the endpoint management service 120. The administrator can provide a list of devices 106 to apply a particular configuration 148, or the devices 106 can be assigned upon enrollment based on device type corresponding to a device platform 156 identified at enrollment time. The user interface can be automatically generated by transforming the device platform 156 into a device management console user interface for that device type.

The platform identifier 158 can be provided in communications from the device 106 to the device connector client 161, to the device connector service 121, and to the endpoint management service 120. The platform identifier 158 can also be identified by the device connector service 121 based on the device identifier 166 and can be provided to the endpoint management service 120 as a parameter during enrollment. This can enable the endpoint management service 120 to identify the appropriate device platform 156 and translate it into a device management console user interface. The endpoint management service 120 can notify an enterprise user that one or more of their devices 106 correspond to a new or updated device platform 156. An enterprise user can then access the device management console of the endpoint management service 120 and design or update a configuration 148 such as a profile, a policy, or a workflow for a device 106 of a device platform 156.

The device connector service 121 can receive management data including a platform-specific device configuration 148 in response to a new or updated configuration 148 created for a new or updated device platform 156. Once a configuration 148 is created for a new or updated device platform 156, the device connector service 121 can receive management data including a platform-specific device configuration 148 in response to the enrollment request based on an enrollment process to enroll a device 106 of that device platform 156. The management data can also include a management token for the device 106, such as an HMAC token. The device connector service 121 can extract the management token and store it in a data store of the tenant computing environment 112.

The device connector service 121 can transmit the management UDID 142 and the device configuration 148 to the device connector client 161. The device connector client 161 can store the management token in the edge device 108 or a data store of the third-party management service 122. The device connector client 161 can transmit the device configuration 148 to the device 106. For example, the device connector client 161 can invoke a function of the device 106 to apply the device configuration 148 to the device 106. Generally, commands and other configurations 148 from the endpoint management service 120 can be provided to the device connector client 161. The device connector client 161 can transmit and apply the configurations 148 to the device 106.

Figure 2:
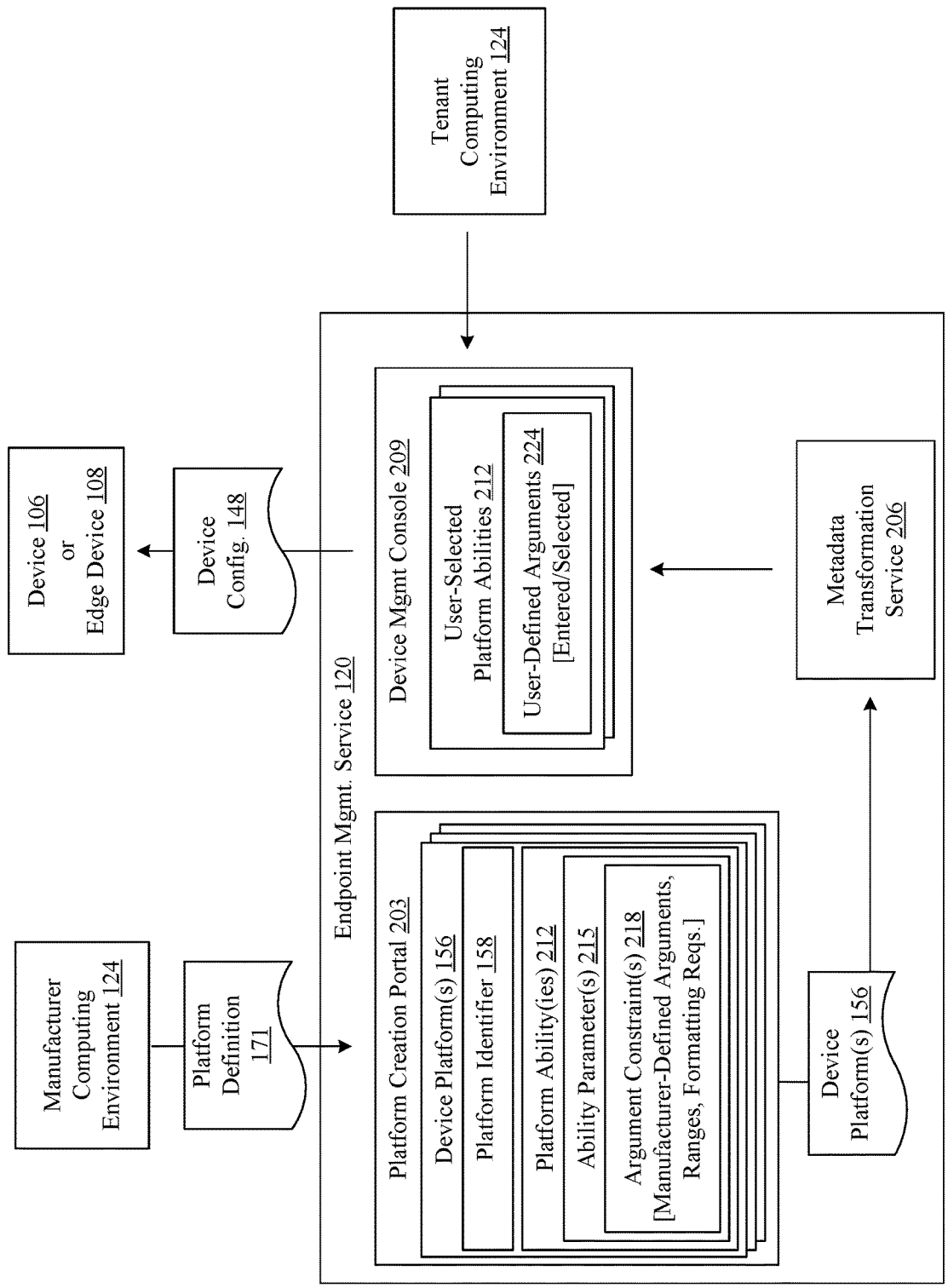
FIG. 2 is a drawing depicting an example of functionalities performed by components of the networked environment for device platform creation and device configuration, according to the present disclosure.

FIG. 2 provides an example of functionalities performed by components of the networked environment 100 for device platform creation and device configuration. Generally, this figure shows how the endpoint management service 120 provides a manufacturer or device provider access to a platform creation portal 203 to define and edit a device platform 156, and uses a metadata transformation service 206 to automatically transform the device platform 156 into a device management console 209, which an enterprise can use to define a configuration 148 for devices 106 corresponding to the device platform 156.

The manufacturer computing environment 124 can interact with the endpoint management service 120 over a network 115 to provide a platform definition 171 through the platform creation portal 203. For example, a user of the manufacturer computing environment 124 can interact with user interface elements that enable the user to enter the platform definition 171, including a platform identifier 158, platform abilities 212, ability parameters 215 for each of the platform abilities 212. A platform ability 212 can include a friendly name or user-readable identifier the platform ability 212, as well as the code, commands, and other instructions that can invoke the platform ability 212 to be performed by a corresponding device 106. The manufacturer can also enter argument constraints 218 for each of the ability parameters 215. The platform creation portal 203 can include user interface elements to enter and create a device platform 156 through interaction with the user interface elements. The platform creation portal 203 can include a user interface element to upload a device platform 156 file that is provided in a particular format.

The platform creation portal 203 can enable the manufacturer to enter or otherwise define a platform identifier 158 and one or more model numbers of devices 106 that correspond to a device platform 156. The device platform 156 can in some cases specify a device type. A device type can refer to a designation such as "camera" or "light." The device type can be defined within the endpoint management service 120 to have a predetermined or management-service-defined set of base platform abilities 212. These base platform abilities 212 can take a management-service-defined set of ability parameters 215 and argument constraints 218. However, the ability instructions such as code and commands to invoke the platform abilities 212 can be provided by the manufacturer and can be specific to the device platform 156. This can allow a manufacturer to provide a new device that is automatically mapped to a predetermined initial profile that is already in place for other devices 106 of that type in the enterprise environment. While a device platform 156 that designates a predetermined device type can include a predetermined set of base platform abilities 212 that conform to predetermined ability parameters 215 and argument constraints 218, the device platform 156 can nevertheless include additional platform abilities 212 that can be utilized and included in a configuration 148 that is designed by an enterprise user through the device management console 209.

A platform identifier 158 can be a model number, and in other cases multiple model numbers can be mapped to a single platform identifier 158. The platform identifier 158 can be unique among all device platforms 156 in a device platform registry 154 of the endpoint management service 120. The platform creation portal 203 can query the device platform registry 154 automatically in response to entry or submission of the platform identifier 158, to ensure that the manufacturer-entered platform identifier 158 is unique. If the platform identifier 158 is unique, then the submission can be accepted. However, if the platform identifier 158 is duplicative or non-unique, then the platform creation portal 203 can generate a user interface element that indicates that the platform identifier 158 is duplicative.

The platform creation portal 203 can enable the manufacturer user to specify one or more platform abilities 212 for the device platform 156. The platform abilities 212 can include actions that can be performed by devices 106 corresponding to the device platform 156. The actions or platform abilities 212 can include detecting and transmitting a sensor sample; connecting to a wireless network such as a WiFi, Bluetooth, ZigBee, or other wireless network; performing a physical action such as moving an actuator such as opening or closing a lock or door mechanism; performing an electronic action such as setting an electronic device activation status such as activating or deactivating a light, speaker, thermostat, fan, or other device. Electronic actions can also include setting a color of a light, flashing the light, emitting a sound, setting the sound, setting a temperature, setting a control setting, and others.

The platform creation portal 203 can enable the manufacturer user to specify an identifier or user friendly name for each platform ability 212, and can also enable the manufacturer to enter or upload instructions to perform the platform ability 212. The instructions can include code, or a command in a syntax used for the device platform 156. The instructions can be used to invoke the platform ability 212 according to the ability parameters 215. In some cases, the instructions to perform the platform ability 212 can include placeholders such as references, identifiers, or characters that represent the ability parameters 215.

Each ability parameter 215 can also include a name or user friendly name that can be entered through the user interface elements of the platform creation portal 203. The ability parameters 215 can adjust the way the device 106 performs a platform ability 212. For example, a manufacturer can specify that a device platform 156 has a platform ability 212 to connect to a wireless network. The ability parameters 215 for a wireless networking platform ability 212 can include a first parameter that specifies a type of wireless connection such as WiFi, Bluetooth, or ZigBee; a second parameter that specifies a name such as a service set identifier (SSID) of a wireless network to connect to; a third parameter that specifies a security type or security option used by the wireless network, and so on.

Alternatively, protocol-specific platform abilities 212 can be provided such as a WiFi-specific wireless connection platform ability 212 and a Bluetooth-specific wireless connection platform ability 212. In that case, there may not be a parameter that specifies the type of connection. Each of the ability parameters 215 can be used to modify or adjust the platform ability 212 that is performed by a device 106. The ability parameters 215 can be provided so that end users, such as enterprise tenants of the endpoint management service 120, can configure a device 106 for their use case and environment.

Since the usage of different ability parameters 215 can vary, the platform creation portal 203 can enable the manufacturer user to specify argument constraints 218 for each ability parameter 215. The argument constraints 218 can include a manufacturer-defined set of arguments that can be used for the ability parameter 215. A device platform 156 for a lighting device 106 can have a platform ability 212 that sets a lighting state, and the manufacturer can provide argument constraints 218 that limit an activation status to "on," and "off." In some cases, "on" and "off" can be provided as arguments directly into the code or command instructions to set the lighting device 106 on and off. In other cases, these friendly names can be mapped to characters or actual arguments that are used with the code or command instructions. For example, the friendly name "off" can be mapped to an actual argument "0" and the friendly name "on" can be mapped to "1." The platform creation portal 203 can provide user interface elements to define argument constraints 218 that include friendly names and mappings to actual arguments.

The argument constraints 218 can include a range of appropriate argument values that a user can enter. For example, a device platform 156 for a sensor device 106 can include a platform ability 212 to provide a sample that includes a sensor reading periodically. An ability parameter 215 can specify how often to provide a sample. The manufacturer can define argument constraints 218 that indicate a range of frequencies or a range of times that adjust how often the sensor device 106 provides a sample.

The argument constraints 218 can include formatting requirements for user-defined arguments 224. For example, a device platform 156 for a speaker device 106 can include a platform ability 212 to play a sound file from a uniform resource identifier (URI) or uniform resource link (URL). An ability parameter 215 can specify the URI or URL. The manufacturer can define argument constraints 218 that specify a format for the URI or URL, for example, whether to include "http://," "https://," and so on. In some cases, the argument constraints 218 can include textual instructions and examples of appropriate formatting that can be used within the code or command instructions for a platform ability 212. A formatting requirement argument constraint 218 can also include a specified data type such as integer, character, float, double, string, and Boolean.

Once a device platform 156 is created or updated through the platform creation portal 203, the endpoint management service 120 can transform the data from the device platform 156 into user interface elements of a device management console 209. For example, the endpoint management service 120 can transmit or provide the device platform 156 to a metadata transformation service 206 of the endpoint management service 120. The metadata transformation service 206 can take the data of the device platform 156 including platform abilities 212, ability parameters 215, and argument constraints 218 as inputs. The metadata transformation service 206 can generate outputs that include user interface elements of a device management console 209. For example, the metadata transformation service 206 can identify a set of platform abilities 212 for a device platform 156 and generate one or more user interface elements that enable an enterprise user to select a platform ability 212 to apply it to a configuration 148. The user-selected platform abilities 212 can be selected through the device management console 209.

The metadata transformation service 206 can generate user interface elements to specify user-defined arguments 224 for each of the ability parameters 215 of a user-selected platform ability 212. The device management console 209 can incorporate these user interface elements. The user interface elements can enable a user to enter or type in user-defined arguments 224 that correspond to the argument constraints 218. In some cases, a textual description of the argument constraints 218, such as a range of values and formatting requirements, can be generated and shown relative to the user interface element to enter the user-defined arguments 224. In other cases, the user interface elements can enable a user to select user-defined arguments 224 from a number of manufacturer-defined arguments defined as argument constraints 218. The device platform 156 can be translated into a dynamic user interface payload that can be used to generate the device management console 209.

The endpoint management service 120 can transform the device platform 156 to automatically generate the device management console 209 to include user interface elements that identify user-defined arguments 224 for ability parameters 215. The endpoint management service 120 can identify the device platform 156 and generate the device management console 209 in response to a user request to create a configuration 148 for one or more devices 106 corresponding to the device platform 156. In other cases, the endpoint management service 120 can identify the device platform 156 and generate the device management console 209 in response to a request to onboard a device 106 corresponding to the device platform 156. For example, an auto-discovery process of the device 106 can transmit a platform identifier 158 or a serial number that the endpoint management service 120 maps to the platform identifier 158.

The endpoint management service 120 can also generate a configuration 148 for a device 106 based on the user interactions with the device management console 209. Since the device management console 209 can be automatically generated by transformation of the device platforms 156, this can increase the speed and efficiency of integrating a new device 106 for management and configuration using the endpoint management service 120. This also increases the adoption rate of the new device 106 in an enterprise environment for enterprises that employ the endpoint management service 120.

Figure 3:
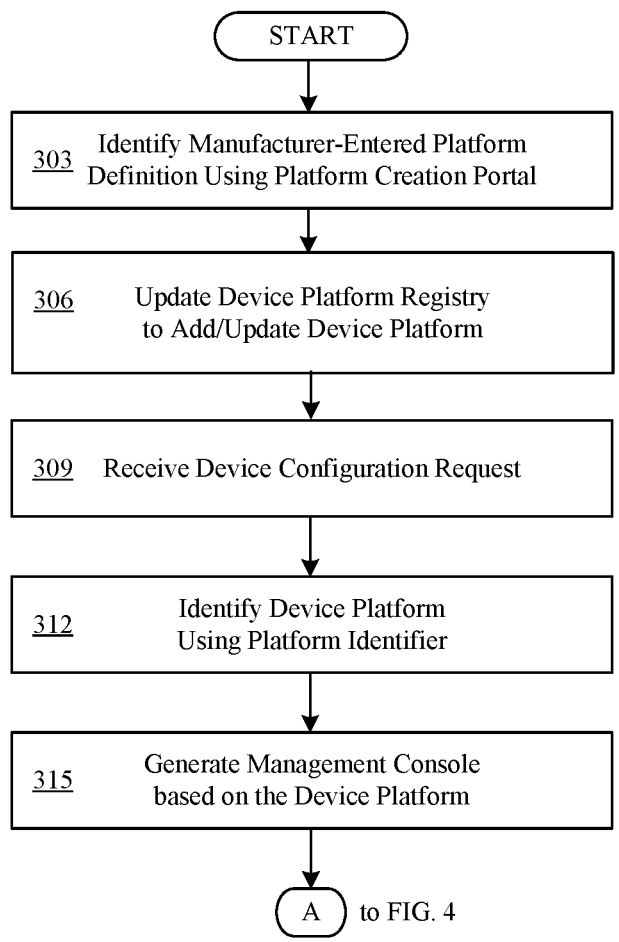
FIG. 3 is a flowchart depicting an example of functionalities performed by components of the networked environment for device platform creation and device configuration, according to the present disclosure.

FIG. 3 is a flowchart depicting an example of functionalities performed by components of the networked environment 100 for creation of a device platform 156 and device configurations 148. Generally, the flowchart shows how the endpoint management service 120 can create or update a device platform 156 through a manufacturer platform creation portal 203, update a device platform registry 154, and generate a device management console 209. While the steps are described as performed by the endpoint management service 120, other components of the networked environment 100 can perform some of the functionalities described.

In step 303, the endpoint management service 120 can identify the manufacturer entered platform definition data using a platform creation portal 203. The manufacturer computing environment 124 can interact with the platform creation portal 203 over a network 115 to provide a platform definition 171. For example, a user of the manufacturer computing environment 124 can authenticate with the endpoint management service 120 to access the platform creation portal 203. The user can then interact with user interface elements that enable the user to enter the platform definition 171, including a platform identifier 158, platform abilities 212, and ability parameters 215 for each of the platform abilities 212. The manufacturer can also enter argument constraints 218 for each of the ability parameters 215. The platform creation portal 203 can include user interface elements to enter and create a device platform 156 through interaction with the user interface elements. The platform creation portal 203 can include a user interface element to upload a device platform 156 file that is provided in a particular format.

In step 306, the endpoint management service 120 can update a device platform registry 154 to add or update a device platform 156. The endpoint management service 120 can generate or update a device platform 156 based on the manufacturer-provided platform definition 171 identified through the platform creation portal 203. The endpoint management service 120 can then store the device platform 156 in the device platform registry 154 in the data store 118.

In step 309, the endpoint management service 120 can receive a device configuration request. For example, the endpoint management service 120 can receive a device configuration as part of an onboarding or auto-discovery process for a device 106. Alternatively, an enterprise user can initiate a device configuration request for one or more devices 106, or for a particular device platform 156.

In step 312, the endpoint management service 120 can identify a device platform 156 using a platform identifier 158 associated with the device configuration request. In the example of an onboarding or auto-discovery process, a device 106 can transmit information that includes a platform identifier 158 or a model number of the device 106. The endpoint management service 120 can map the model number to a platform identifier 158. The platform identifier 158 can be used as a key value to identify and retrieve a particular device platform 156 from the device platform registry 154.

In the example of a user-initiated device configuration request, an enterprise user can interact with the device management console 209 to select a device 106 or a group 146 of devices 106 to configure. The endpoint management service 120 can identify a device platform 156 using a platform identifier 158 for the device 106 or group 146. Alternatively, the enterprise user can select the device platform 156 from a list of device platforms 156, in order to create a configuration 148 for devices 106 corresponding to the device platform 156.

In step 315, the endpoint management service 120 can generate a device management console 209 based on the device platform 156. The endpoint management service 120 can transform the device platform 156 to automatically generate the device management console 209 to include user interface elements that identify user-defined arguments 224 for ability parameters 215.

Figure 4:
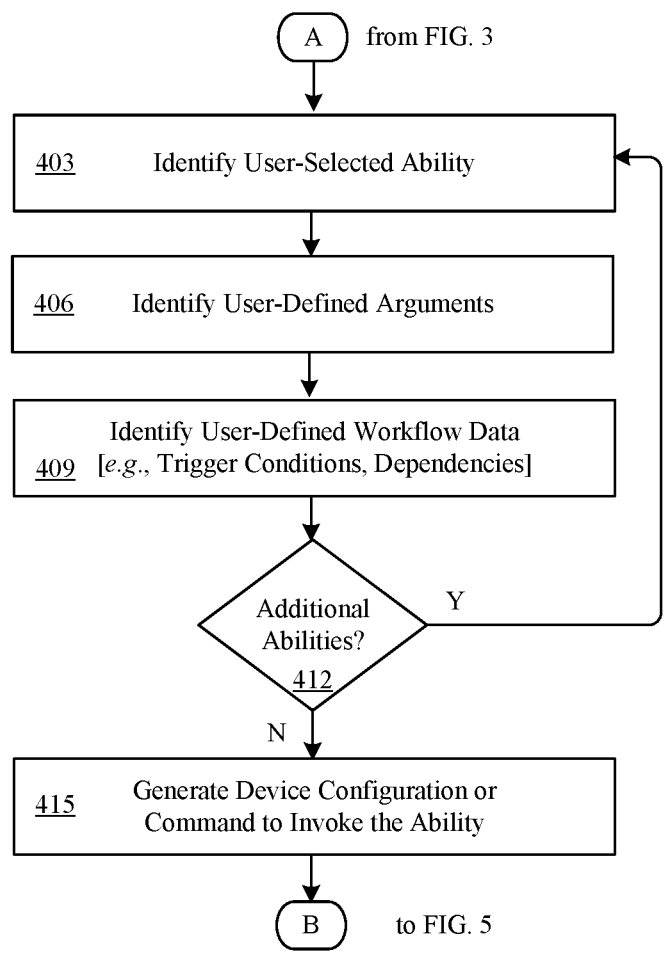
FIG. 4 is a flowchart depicting another example of functionalities performed by components of the networked environment for device platform creation and device configuration, according to the present disclosure.

FIG. 4 is a flowchart depicting an example of functionalities performed by components of the networked environment 100 for creation of a device platform 156 and device configurations 148. Generally, the flowchart shows how the endpoint management service 120 can generate a device management console 209 that identifies a configuration 148 for a device 106 corresponding to a particular device platform 156. While the steps are described as performed by the endpoint management service 120, other components of the networked environment 100 can perform some of the functionalities described.

In step 403, the endpoint management service 120 can identify user-selected platform abilities 212. For example, the endpoint management service 120 can identify a set of platform abilities 212 for a device platform 156 and generate one or more user interface elements that enable an enterprise user to select a platform ability 212 to apply it to a configuration 148. The user-selected platform abilities 212 can be selected through the device management console 209.

In step 406, the endpoint management service 120 can identify user-defined arguments 224 for the platform ability 212. The endpoint management service 120 can generate user interface elements to specify user-defined arguments 224 for each of the ability parameters 215 of a user-selected platform ability 212. The device management console 209 can incorporate these user interface elements. The user interface elements can enable a user to enter or type in user-defined arguments 224 that correspond to the argument constraints 218.

In step 409, the endpoint management service 120 can identify user-defined workflow data. For example, the workflow data can indicate prerequisites, dependencies, and trigger conditions that causes the platform ability 212 to be invoked. Since the devices 106 can be agentless or management agentless, the workflow data can be maintained and implemented using the endpoint management service 120. Once the prerequisite trigger conditions indicated by the workflow data are met, the endpoint management service 120 can place a command in a command queue, which the device connector service 121 and the device connector client 161 can deliver to the device 106 to invoke the platform ability 212 according to the user-defined arguments 224. The workflow data can include using a specified platform ability 212 at a particular time or on a periodic schedule, performing the platform ability 212 in response to sensor data detected using another platform ability 212 for the same device 106 or a different device 106, and so on.

In step 412, the endpoint management service 120 can identify whether additional platform abilities are to be added to the configuration 148. The device management console 209 can include a user interface element such as an "add additional ability" element that can be user selected through the device management console 209. A platform ability selection user interface element can be generated, and the process can move to step 403. In other examples, the platform ability selection user interface element can be automatically generated, and the process can move to step 403 if a user selects another platform ability 212. The device management console 209 can include a user interface element such as a "save configuration," "configuration complete," or "transmit configuration" element that can be user selected through the device management console 209, after which the process can move to step 415.

In step 415, the endpoint management service 120 can generate a device configuration 148. The endpoint management service 120 can save it in the data store 118. The endpoint management service 120 can also associate the configuration 148 with a particular device 106 or a group 146 of devices 106. The endpoint management service 120 can further associate the configuration 148 with the device platform 156 so that any additional devices 106 that are activated, enrolled, or otherwise onboarded can be automatically provided the configuration 148.

Figure 5:
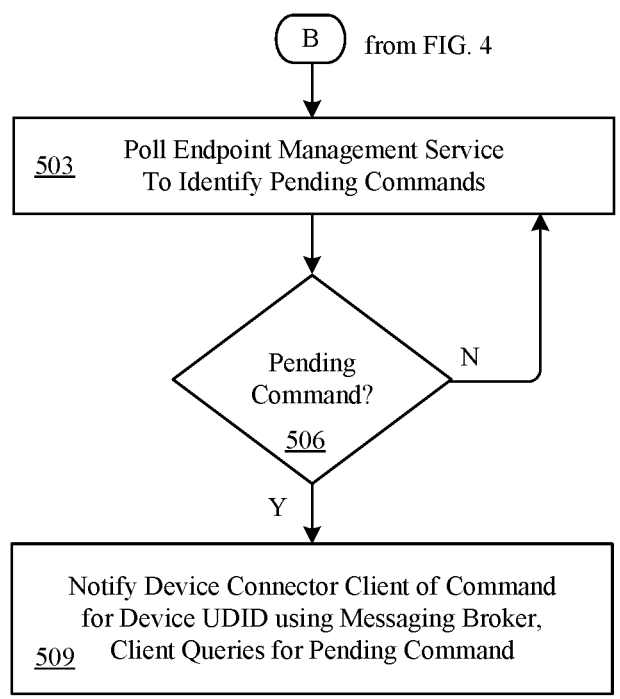
FIG. 5 is a flowchart depicting another example of functionalities performed by components of the networked environment for device platform creation and device configuration, according to the present disclosure.

FIG. 5 is another flowchart depicting functionalities performed by components of the networked environment 100 for configuration of the device 106 using the device connector service 121 and the endpoint management service 120. While the flowchart is discussed as generally performed by the device connector service 121, some elements are also implemented by other components of the networked environment 100.

In step 503, the device connector service 121 can poll the endpoint management service 120 to get notified of any pending commands for any devices 106 it manages. This can include invoking an endpoint management service API or otherwise querying the endpoint management service 120 to identify available commands for one or more device 106 that are integrated using the device connector service 121. This can include individual polling for individual devices 106, batch requests for multiple devices, or a subscription publication-based mechanism that notifies the device connector service 121 of available commands for the devices 106 it integrates or 'manages.'

In some examples, the device connector service 121 can receive a device communication relayed by the device connector client 161 from the client device 106. The device connector client 161 can receive the device communication such as a device data 150 sample, or a check-in beacon from a device 106. The device connector client 161 can identify and invoke a corresponding API of the device connector service 121. The device communication can include the device data 150 sample or a check-in beacon command and can identify the originating device 106 using the management UDID 142. The device connector client 161 can forward the device communication along with device connector authentication data, such as an API token for the connector APIs. The device connector service 121 can authenticate the device communication using the API token and certificate mutual authentication, such as a certificate exchange between the device connector service 121 and the device connector client 161.

The device connector service 121 can transmit the device communication to the endpoint management service 120 with the endpoint management authentication data. The device connector service 121 can authenticate communications with the endpoint management service 120 on behalf of the device 106. This enables the device connector service 121 to relay a device data 150 sample, or a check-in beacon to the endpoint management service 120 along with appropriate authentication requirements. The device connector service 121 can forward the device communications along with endpoint management service authentication data, such as a management token for the endpoint management service APIs.

The endpoint management service 120 can receive device communications as described for any number of devices 106 and can analyze this information to identify that one or more prerequisite condition is met. The endpoint management service 120 can then place a command to invoke a particular platform ability 212 for a particular device 106 in a command queue for the device 106. The command to invoke the platform ability 212 for the device 106 can refer to applying a configuration 148 that invokes a platform ability 212 according to user-defined arguments 224.

In step 506, the device connector service 121 can determine whether a pending command or other instructions are identified in a command queue. If the device connector service 121 identifies a pending command for a device 106, the process can move to step 509. Otherwise, the process can move to step 503.

In step 509, the device connector service 121 can notify the device connector client 161 that is associated with that device 106 and its management UDID 142. The device connector service 121 can identify the device 106 that has a pending command and look up the device connector client 161 associated with its management UDID 142. The device connector service 121 can include the management UDID 142 in the notification to the device connector client 161. The notification process can include publishing to the message broker such as an MQTT broker, which can be a message broker component 137 of the device connector service 121.

The device connector client 161 can have a messaging subscription with the message broker component 137 to pick up the notification. The notification can contain the management UDID 142 in the message. The device connector client 161 can query the device connector service 121 for the actual command payload. The device connector service 121 can relay the command retrieval request to the endpoint management service 120.

The endpoint management service 120 can provide a command from the device 106 command queue to the device connector client 161, which relays the command back to the device 106. In other examples, the endpoint management service 120 can return the command to the device connector service 121, which can transmit the command to the device connector client 161, which provides the commands to the device 106. The device 106 can then perform the platform ability 212 according to the user-defined arguments 224 for manufacturer-defined ability parameters 215.

Stored in the memory device are both data and several components that are executable by the processor. In particular, stored in the one or more memory devices and executable by the device processor can be applications and other executable instructions. Also, stored in the memory can be a data store and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as, object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The devices 106 can include a display upon which a user interface can be rendered. In some examples, the user interface can be generated using user interface data provided by the management computing environment 103 and the tenant computing environment 112. The device 106 can also include one or more input/output devices that can include, for example, a capacitive touchscreen or other type of touch input device, fingerprint reader, or keyboard.

Although the endpoint management services 120, the device connector service 121, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram(s) and/or flowchart(s) shows examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A system, comprising:
   at least one computing device comprising at least one processor; and
   at least one memory comprising instructions executable by the at least one processor, wherein the instructions, when executed by the at least one processor, cause the at least one computing device to at least:
   generate, by a management service, a platform creation portal user interface rendered for display by the at least one computing device;
   identify, through the platform creation portal user interface, user interactions with the at least one computing device that define a device platform comprising:

a platform ability, at least one ability parameter that adjusts the platform ability, instructions that invoke the platform ability to be performed by the at least one computing device according to arguments provided for the at least one ability parameter, and argument constraints for the at least one ability parameter;

update, by the management service, a device platform registry to include the platform ability and the at least one ability parameter;

receive, by the management service, a device configuration request associated with the device platform; and transform, by the management service, the device platform to automatically generate a device management console user interface rendered for display by the at least one computing device, the device management console user interface comprising user interface elements that receive at least one user-defined argument as input for the at least one ability parameter.

2. The system of claim 1, wherein the instructions, when executed by the at least one processor, cause the at least one computing device to at least:

generate, by the management service, device data comprising a device configuration that invokes the platform ability according to the at least one user-defined argument for the at least one ability parameter; and transmit the device configuration to a device connector client to apply the device configuration to a device corresponding to the device platform.

3. The system of claim 2, wherein the device is identified based on a platform identifier associated with the device platform within the device platform registry.

4. The system of claim 3, wherein the instructions, when executed by the at least one processor, cause the at least one computing device to at least:

query, by the management service, the device platform registry using the platform identifier to ensure that the platform identifier is unique among a plurality of platform identifiers; and update, by the management service, the device management console user interface to indicate a uniqueness status of the platform identifier based on the query.

5. The system of claim 1, wherein the platform creation portal user interface further identifies machine-readable instructions that invoke the platform ability according to the at least one ability parameter.

6. The system of claim 5, wherein devices corresponding to the device platform comprise manufacturer-loaded instructions that provide a platform identifier in device registration data transmitted as part of an auto-discovery process.

7. The system of claim 1, wherein the platform creation portal user interface further identifies user-defined workflow data that indicates a trigger condition for the platform ability.

8. A non-transitory computer-readable medium comprising instructions executable by at least one processor, wherein the instructions, when executed by the at least one processor, cause at least one computing device to at least:

generate, by a management service, a platform creation portal user interface rendered for display by the at least one computing device;

identify, through the platform creation portal user interface, user interactions with the at least one computing device that define a device platform comprising: a platform ability, and at least one ability parameter that adjusts the platform ability, instructions that invoke the platform ability to be performed by the at least one computing device according to arguments provided for the at least one ability parameter, and argument constraints for the at least one ability parameter;

update, by the management service, a device platform registry to include the platform ability and the at least one ability parameter;

receive, by the management service, a device configuration request associated with the device platform; and transform, by the management service, the device platform to automatically generate a device management console user interface rendered for display by the at least one computing device, the device management console user interface comprising user interface elements that receive at least one user-defined argument as input for the at least one ability parameter.

9. The non-transitory computer-readable medium of claim 8, wherein the instructions, when executed by the at least one processor, cause the at least one computing device to at least:

generate, by the management service, device data comprising a device configuration that invokes the platform ability according to the at least one user-defined argument for the at least one ability parameter; and transmit the device configuration to a device connector client to apply the device configuration to a device corresponding to the device platform.

10. The non-transitory computer-readable medium of claim 9, wherein the device is identified based on a platform identifier associated with the device platform within the device platform registry.

11. The non-transitory computer-readable medium of claim 10, wherein the instructions, when executed by the at least one processor, cause the at least one computing device to at least:

query, by the management service, the device platform registry using the platform identifier to ensure that the platform identifier is unique among a plurality of platform identifiers; and update, by the management service, the device management console user interface to indicate a uniqueness status of the platform identifier based on the query.

12. The non-transitory computer-readable medium of claim 8, wherein the platform creation portal user interface further identifies machine-readable instructions that invoke the platform ability according to the at least one ability parameter.

13. The non-transitory computer-readable medium of claim 12, wherein devices corresponding to the device platform comprise manufacturer-loaded instructions that provide a platform identifier in device registration data transmitted as part of an auto-discovery process.

14. The non-transitory computer-readable medium of claim 8, wherein the platform creation portal user interface further identifies user-defined workflow data that indicates a trigger condition for the platform ability.

15. A method performed by instructions executed by at least one processor of at least one computing device, the method comprising:

generating, by a management service, a platform creation portal user interface rendered for display by the at least one computing device;

identifying, through the platform creation portal user interface, user interactions with the at least one computing device that define a device platform comprising: a platform ability, and at least one ability parameter that adjusts the platform ability, instructions that invoke the platform ability to be performed by the at least one computing device according to arguments provided for the at least one ability parameter, and argument constraints for the at least one ability parameter;

updating, by the management service, a device platform registry to include the platform ability and the at least one ability parameter;

receiving, by the management service, a device configuration request associated with the device platform; and transforming, by the management service, the device platform to automatically generate a device management console user interface rendered for display by the at least one computing device, the device management console user interface comprising user interface elements that receive at least one user-defined argument as input for the at least one ability parameter.

16. The method of claim 15, further comprising:

generating, by the management service, device data comprising a device configuration that invokes the platform ability according to the at least one user-defined argument for the at least one ability parameter; and transmitting the device configuration to a device connector client to apply the device configuration to a device corresponding to the device platform.

17. The method of claim 16, wherein the device is identified based on a platform identifier associated with the device platform within the device platform registry.

18. The method of claim 17, further comprising:

querying, by the management service, the device platform registry using the platform identifier to ensure that the platform identifier is unique among a plurality of platform identifiers; and updating, by the management service, the device management console user interface to indicate a uniqueness status of the platform identifier based on the query.

19. The method of claim 15, wherein the platform creation portal user interface further identifies machine-readable instructions that invoke the platform ability according to the at least one ability parameter.

20. The method of claim 19, wherein devices corresponding to the device platform comprise manufacturer-loaded instructions that provide a platform identifier in device registration data transmitted as part of an auto-discovery process.

* * * * *